United States Patent Office 2,752,282
Patented June 26, 1956

2,752,282
AGRICULTURAL FUNGICIDE

Albert A. Somerville, Carmel, N. Y., assignor to R. T. Vanderbilt Company, Inc., New York, N. Y., a corporation of New York No Drawing. Application September 17, 1952,
Serial No. 310,130

1 Claim. (Cl. 167—22)

My invention relates to a new composition of matter which is particularly adapted for use as an agricultural fungicide.

As is well known in the art, the ferric salt of dimethyl dithiocarbamic acid is a widely used agricultural fungicide. Where fungicides are used, however, it is desirable that the fungicide employed be as active as possible on a weight basis, and in accordance with my present invention I have prepared a fungicidal composition which, although closely related to the ferric salt of dimethyl dithiocarbamic acid, possesses a definitely higher order of toxicity, when compared with the ferric salt of dimethyl dithiocarbamic acid on a weight basis.

The fungicide of my invention contains as active fungicidal ingredients about 99 per cent by weight of the ferric salt of a mixture of dimethyl dithiocarbamic acid and 2-mercaptobenzothiazole in the weight ratio of about 90:10 and about 1 per cent by weight of the zinc salt of the aforementioned mixture, based upon the total weight of the two aforementioned salts. Thus, one way in which the fungicide of my invention can be prepared is set forth in the following example.

EXAMPLE

In order to make a batch of the ferric salt of the mixture of dimethyl dithiocarbamic acid and 2-mercaptobenzothiazole, 127 pounds of $FeCl_3.6H_2O$ is dissolved in 4000 pounds of water at a temperature of 140° F. The solution is well agitated and to it is added over a period of one-half hour 668 pounds of an aqueous solution prepared by mixing 95 parts by weight of a 30 per cent by weight aqueous solution of sodium dimethyl dithiocarbamate and five parts by weight of a 45 per cent by weight aqueous solution of the sodium salt of 2-mercaptobenzothiazole. Agitation is continued for approximately 15 minutes, after which a small sample of the nearly black slurry is filtered and the filtrate divided into two portions. To one portion is added a few drops of $FeCl_3.6H_2O$ solution and to the other is added a few drops of the aforementioned aqueous solution of sodium dimethyl dithiocarbamate and the sodium salt of 2-mercaptobenzothiazole. A very slight excess of $FeCl_3.6H_2O$ should be present in the batch, and therefore the portion to which the aqueous solution of sodium dimethyl dithiocarbamate and the sodium salt of 2-mercaptobenzothiazole is added should cloud slightly. Adjustments to the slurry are made to attain this by adding small portions of either of the reactants. After the final adjustment is made, the slurry is filtered by conventional means and washed free of chloride ions, aqueous silver nitrate solution being used to determine the completeness of the washing. The insoluble salt is then dried at approximately 150° F. to a moisture content of 0.05 per cent or less.

In order to prepare a wettable fungicidal powder from the insoluble salt made as described in the preceding paragraph, to 75 pounds of the ferric salt are added 17 pounds of clay, 5 pounds of Silene EF (a proprietary product, being a white, extremely finely divided, precipitated, hydrated calcium silicate), 2 pounds of Darvan No. 1 (a proprietary product, being the sodium salt of polymerized polyaryl sulfonic acids) and 1 pound of sodium dodecyl benzene sulfonate. The mixture is blended in a ribbon type blender for approximately 5 to 10 minutes, after which the mixture is ground by the use of a micro-atomizer type grinder to obtain a particle size of 3–6 microns.

In order to make a batch of the zinc salt of the mixture of dimethyl dithiocarbamic acid and 2-mercaptobenzothiazole, to 520 pounds of an aqueous solution composed of 95 parts by weight of a 30 per cent by weight aqueous solution of sodium dimethyl dithiocarbamate and 5 parts by weight of a 45 per cent by weight aqueous solution of the sodium salt of 2-mercaptobenzothiazole there is added 100 pounds of $ZnSO_4.H_2O$ and 1.6 pounds of concentrated sulfuric acid. From the reaction mixture there precipitates 161 pounds of the zinc salt of a mixture of dimethyl dithiocarbamic acid and 2-mercaptobenzothiazole. The precipitate is thereafter separated, washed and dried as described in the second preceding paragraph. This zinc salt is prepared into a second wettable powder in the manner described in the preceding paragraph.

One series of tests which was conducted in order to determine the fungicidal activity of the composition of the present invention with the fungicidal activities of the ferric and zinc salts present therein involved the use of a standardized agar incorporation technique. In performing the tests, one part by weight of the aforementioned wettable powder containing the ferric salt was added to 99 parts by weight of water to form a suspension, and a second suspension was also prepared by adding one part by weight of the aforementioned wettable powder containing the zinc salt to 99 parts by weight of water. The suspensions were used separately and also in admixture with each other in performing the tests. Thus, a specific embodiment of a composition falling within the scope of my invention was prepared by mixing 99 per cent by weight of the aqueous suspension of the ferric salt and 1 per cent by weight of the aqueous suspension of the zinc salt. In the tests, a quantity of mycophil agar and a quantity of a particular aqueous suspension, the total volume of the agar and aqueous suspension taken being 15 ml., were mixed together on an agar plate having a diameter of 15 centimeters by rotating the plate. The agar was then allowed to harden, and was surface inoculated with an organism which was permitted to incubate at about 45° C. for a given period of time, after which the agar was examined for evidence of growth. The following table sets forth the results obtained when the ferric salt was used alone, when the zinc salt was used alone and when a 99:1 ratio of the ferric and zinc salts were used.

*Active fungicidal ingredients in the agar*

| Wt. Percent of Ferric Salt | Wt. Percent of Zinc Salt | P. p. m. of Salt (or salt mixture) to inhibit germination | |
|---|---|---|---|
| | | A. niger | Pen. sp. |
| 100 | 0 | 300 | 300 |
| 99 | 1 | 50 | 50 |
| 0 | 100 | 300 | 300 |

In the preceding table, the weight per cents are based upon the total weight of the salt or salts present in the agar.

When the pure ferric salt of dimethyl dithiocarbamic acid and the pure zinc salt of dimethyl dithiocarbamic acid, and the 99:1 mixture thereof, were tested in accordance with the procedure just outlined, the results were as follows:

*Active fungicidal ingredients*

| Wt. percent ferric dimethyldithiocarbamate | Wt. percent zinc dimethyldithiocarbamate | P. p. m. of Salt (or salt mixture) to inhibit germination | |
|---|---|---|---|
| | | A. niger | Pen. sp. |
| 100 | 0 | 200 | 200 |
| 99 | 1 | 200 | 200 |
| 0 | 100 | 300 | 300 |

Further tests were also conducted in order to compare the fungicidal effectiveness of the ferric salt of the mixture of dimethyl dithiocarbamic acid and 2-mercaptobenzothiazole, the zinc salt of the mixture, and a mixture of the two salts. The test method consisted of a test tube dilution, using a nutrient salt solution (composed of 40 grams of dextrose, 2 grams of asparagine, 0.5 gram of potassium dihydrogen phosphate, 0.25 gram of

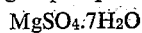

0.0003 gram of thiamine chloride and 1,000 ml. of distilled water), a spore suspension of *Aspergillus niger* (made from mature, healthy culture tubes by washing a given tube with four aliquots of 5 ml. of distilled water and thereafter diluting the washings with distilled water to a total of 200 ml.) and a suspension of the protectant (aqueous suspension or mixture of aqueous suspensions prepared as described above).

The dilution test was performed by first adding to a test tube 1 ml. of the nutrient solution, after which 3.50 ml. of the spore suspension was added and the mixture was agitated. In testing the effectiveness of various protectants, varying amounts thereof were added to a given test tube containing the 1 ml. of nutrient solution and the 3.50 ml. of the spore suspension, the final volume of the mixture of nutrient solution, spore supension and protectant suspension in a given test tube being 5 ml. The test tube containing the 5 ml. total mixture was then agitated to attain homogeneity, and by means of a 1 ml. pipette (graduated in 1/100 ml. subdivisions) drops of the mixture were placed on chemically cleaned microscope slides in triplicate.

These slides were placed in large Petri dishes (150 mm. x 20 mm.) containing a quantity of distilled water and a glass rod support which held the slides above the surface of the water. Petri dish covers were placed on the dishes and the spores were then incubated for 48 hours at 30±1° C. The presence of the water in the Petri dishes assured high humidity, thereby preventing the test solutions from drying. At the end of the incubation period, the slides were removed from the Petri dishes and were examined microscopically for signs of germination of the spores. Where no spores had germinated, the protectant at the concentration employed was considered to be completely fungicidal or fungistatic.

The following table contains data using the test method just described.

*Active fungicidal ingredients*

| Wt. percent of Ferric Salt | Wt. percent of Zinc Salt | P. p. m. of Salt (or salt mixture) to inhibit germination |
|---|---|---|
| | | Slide Germination, A. niger |
| 100 | 0 | 10 |
| 99 | 1 | 1 |
| 0 | 100 | 5 |

In the preceding table, the weight per cents are based upon the total weight of the salt or salts present in the protectant suspension.

Various modifications can be made in the specific procedure set forth above in order to practice the present invention. For example, in preparing the ferric salt of the mixture of dimethyl dithiocarbamic acid and 2-mercaptobenzothiazole there can be used water-soluble salts other than $FeCl_3.6H_2O$, for example, $FeCl_3$, $FeCl_3.5H_2O$, $FeCl_3.12H_2O$, $Fe_2(SO_4)_3.9H_2O$, and so forth. Also, the ferric salt can be prepared using aqueous solutions of mixtures of water-soluble salts other than sodium dimethyl dithiocarbamate and sodium 2-mercaptobenzothiazole, for example, the corresponding potassium salts. Moreover, although the ferric salt and mixture of water soluble dimethyl dithiocarbamate and water-soluble salt of 2-mercaptobenzothiazole should be used in substantially stoichiometric amounts, the temperature at which they are reacted can be varied widely, for example, from about 40° F. to about 200° F., and in preparing the ferric salt the concentrations of the reactants in the reaction mixture are not critical, the ferric salt being a material which is quite insoluble in water. These remarks also apply with respect to the preparation of the zinc salt of the mixture of dimethyl dithiocarbamic acid and 2-mercaptobenzothiazole in that water-insoluble zinc salts other than $ZnSO_4.H_2O$ (e. g., $ZnCl_2$) can be used, in that water-soluble salts of dimethyl dithiocarbamic acid and 2-mercaptobenzothiazole other than the sodium salts can be used, in that the water-soluble zinc salt and the water-soluble salts of dimethyl dithiocarbamic acid and 2-mercaptobenzothiazole should be used in substantially stoichiometric amounts, and in that the reaction temperature can be varied widely. Furthermore, instead of preparing the ferric and zinc salts separately and thereafter mixing them, they can be prepared by mixing an aqueous solution containing a mixture of water-soluble iron and zinc salts with an aqueous solution containing a water-soluble salt of dimethyl dithiocarbamic acid and a water-soluble salt of 2-mercaptobenzothiazole.

In the specific example, the embodiment of the composition of the present invention prepared was made by mixing two wettable powders, one of which contained the ferric salt and the other of which contained the zinc salt. It is not necessary that the present invention be practiced in this manner, since a suitable composition can also be prepared by first mixing the dry salts and then compounding the mixture produced with the carrier or carriers and wetting and dispersing agents. Among the suitable carriers which can be used to support the active ingredients of the present composition are any of the conventional inert, solid diluents, such as lime, bentonite, talc, pyrophyllite, gypsum, chalk, silica, and the like.

One preferred method of application of the composition of my invention involves spraying with a mixture composed of about two pounds of wettable powder prepared as described above and 100 gallons of water. This spray is applied at intervals, depending upon weather and disease conditions, being useful as a general agricultural fungicide for the control of the common fungal diseases of apples, cranberries, small fruits, roses and ornamentals.

I claim:

An agricultural fungicide containing as active fungicidal ingredients about 99 per cent by weight of the ferric salt of a mixture of dimethyl dithiocarbamic acid and 2-mercaptobenzothiazole in the weight ratio of about 90:10 and about 1 per cent by weight of the zinc salt of said mixture, based upon the total weight of the two aforementioned salts.

References Cited in the file of this patent

UNITED STATES PATENTS

| 1,962,109 | Alvord | June 5, 1934 |
| 1,972,961 | Tisdale | Sept. 11, 1934 |
| 2,614,958 | Somerville | Oct. 21, 1952 |
| 2,614,959 | Somerville | Oct. 21, 1952 |